US012074019B2

(12) United States Patent
Green et al.

(10) Patent No.: US 12,074,019 B2
(45) Date of Patent: Aug. 27, 2024

(54) QUADRUPOLE DEVICES

(71) Applicant: Micromass UK Limited, Wilmslow (GB)

(72) Inventors: Martin Raymond Green, Bowdon (GB); David J. Langridge, Bollington (GB)

(73) Assignee: Micromass UK Limited, Wilmslow (GB)

( * ) Notice: Subject to any disclaimer, the term of this patent is extended or adjusted under 35 U.S.C. 154(b) by 418 days.

(21) Appl. No.: 17/437,707

(22) PCT Filed: Mar. 11, 2020

(86) PCT No.: PCT/GB2020/050592

§ 371 (c)(1),
(2) Date: Sep. 9, 2021

(87) PCT Pub. No.: WO2020/183160

PCT Pub. Date: Sep. 17, 2020

(65) Prior Publication Data

US 2022/0157594 A1 May 19, 2022

(30) Foreign Application Priority Data

Mar. 11, 2019 (GB) ..................................... 1903213
Mar. 11, 2019 (GB) ..................................... 1903214

(51) Int. Cl.
*H01J 49/42* (2006.01)
*H01J 49/00* (2006.01)

(52) U.S. Cl.
CPC ...... *H01J 49/4215* (2013.01); *H01J 49/0031* (2013.01); *H01J 49/429* (2013.01)

(58) Field of Classification Search
CPC ... H01J 49/4215; H01J 49/0031; H01J 49/429
USPC ........................................ 250/281, 282, 283
See application file for complete search history.

(56) References Cited

U.S. PATENT DOCUMENTS

| | | | |
|---|---|---|---|
| 5,227,629 | A | 7/1993 | Miseki |
| 5,561,291 | A | 10/1996 | Kelley et al. |
| 5,747,801 | A | 5/1998 | Quarmby et al. |
| 6,140,641 | A | 10/2000 | Yoshinari |
| 7,034,292 | B1 | 4/2006 | Whitehouse et al. |

(Continued)

FOREIGN PATENT DOCUMENTS

| | | | |
|---|---|---|---|
| CA | 2656197 | A1 | 1/2008 |
| CN | 101223625 | A | 7/2008 |

(Continued)

OTHER PUBLICATIONS

Search Report under Section 17(5) for United Kingdom Patent Application No. GB 1802589.0, mailed on Aug. 2, 2018, 4 pages.

(Continued)

*Primary Examiner* — Nicole M Ippolito
(74) *Attorney, Agent, or Firm* — Goodwin Procter LLP

(57) ABSTRACT

A method of operating a quadrupole device (10) is disclosed. A voltage source (12) applies a main quadrupolar voltage, an auxiliary quadrupolar voltage and a dipolar voltage to the quadrupole device (10). This may be done such that only ions corresponding to a single X-band, X-band-like, Y-band or Y-band-like stability region are transmitted by the quadrupole device (10).

14 Claims, 5 Drawing Sheets

(56) References Cited

U.S. PATENT DOCUMENTS

| | | | | |
|---|---|---|---|---|
| 10,991,567 | B2 * | 4/2021 | Langridge | H01J 49/0031 |
| 11,201,048 | B2 * | 12/2021 | Langridge | H01J 49/4225 |
| 2002/0074492 | A1 | 6/2002 | Taniguchi | |
| 2004/0232328 | A1 | 11/2004 | Ding et al. | |
| 2007/0295900 | A1 | 12/2007 | Konenkov et al. | |
| 2009/0194688 | A1 | 8/2009 | Bateman et al. | |
| 2010/0084547 | A1 | 4/2010 | Pringle et al. | |
| 2010/0116982 | A1 | 5/2010 | Iwamoto et al. | |
| 2012/0049059 | A1 | 3/2012 | Taniguchi | |
| 2015/0097113 | A1 | 4/2015 | Campbell et al. | |
| 2017/0032954 | A1 | 2/2017 | Giles et al. | |
| 2018/0047549 | A1 | 2/2018 | Quass et al. | |
| 2021/0082679 | A1 | 3/2021 | Green et al. | |

FOREIGN PATENT DOCUMENTS

| | | | |
|---|---|---|---|
| CN | 101536137 | A | 9/2009 |
| CN | 104517798 | A | 4/2015 |
| CN | 105957797 | A | 9/2016 |
| CN | 106463334 | A | 2/2017 |
| CN | 109643634 | A | 4/2019 |
| DE | 10336500 | A1 | 4/2004 |
| GB | 2278232 | A | 11/1994 |
| GB | 2301705 | A | 12/1996 |
| GB | 2421842 | A | 7/2006 |
| JP | S6188445 | A | 5/1986 |
| JP | 2017084450 | A | 5/2017 |
| WO | 199428575 | A1 | 12/1994 |
| WO | 2003021631 | A2 | 3/2003 |
| WO | 2017206965 | A1 | 12/2017 |
| WO | 2018020600 | A1 | 2/2018 |
| WO | 2018046905 | A1 | 3/2018 |
| WO | 2018046906 | A1 | 3/2018 |
| WO | 2020183159 | A1 | 9/2020 |
| WO | 2020183160 | A1 | 9/2020 |

OTHER PUBLICATIONS

Sudakov et al., "Possibility of Operating Quadrupole Mass Filter at High Resolution", International Journal of Mass Spectrometry, vol. 408, pp. 9-19, Sep. 2016.

Sudakov et al., "The Use of Stability Bands to Improve the Performance of Quadrupole Mass Filters", Technical Physics, vol. 61, pp. 107-115, Jan. 2017.

International Search Report and Written Opinion of International Patent Application No. PCT/GB2019/050404, mailed on May 3, 2019, 16 pages.

Combined Search and Examination Report under Sections 17 and 18(3) for United Kingdom Patent Application No. GB1902127.8, mailed on Aug. 8, 2019, 6 pages.

Konenkov et al., "Quadrupole Mass Filter Acceptance in Stability Island Created by Double-Frequency Quadrupole Excitation", European Journal of Mass Spectrometry, vol. 24, pp. 315-321, Feb. 2018.

Search Report under Section 17(5) for United Kingdom Patent Application No. GB1802601.3, mailed on Aug. 2, 2018, 3 pages.

International Search Report and Written Opinion for International Patent Application No. PCT/GB2019/050405, mailed on May 8, 2019, 14 pages.

Combined Search and Examination Report under Sections 17 and 18(3) for United Kingdom Patent Application No. GB1902115.3, mailed on Aug. 6, 2019, 7 pages.

Gershman, D. J., et al. "Higher order parametric excitation modes for spaceborne quadrupole mass spectrometers." Review of scientific instruments 82.12 (2011 ): 125109 (Year: 2011).

Konenkov, N.V., et al., "Quadrupole mass filter operation with auxiliary quadrupolar excitation: theory and experiment", International Journal of Mass Spectrometry 208:17-27 (2001).

Quadrupole Mass Spectrometry and Its Applications by P. Dawson (American Inst. of Physics, 1997) Abstract.

Combined Search and Examination Report under Sections 17 and 18(3), for Application Nol. GB2003532.5, dated Sep. 7, 2020, 6 pages.

International Search Report and Written Opinion for International application No. PCT/GB2020/050592, mailed on Jun. 16, 2020, 16 pages.

Douglas, D.J., and Konenkov, NV., "Quadrupole mass filter operation with dipole direct current and quadrupole radiofrequency excitation", Rapid Communications in Mass Spectrometry 32:1971-1977 (2018).

Combined Search and Examination Report under Sections 17 and 18(3), Application No. GB2003530.9 dated Sep. 7, 2020, 7 pages.

Examination Report under Section 18(3) for Application No. GB2003530.9, dated Jul. 30, 2021, 5 pages.

International Search Report and Written Opinion for International Application No. PCT/GB2020/050591, mailed on Jun. 4, 2020.

* cited by examiner

QUADRUPOLE DEVICES

CROSS-REFERENCE TO RELATED APPLICATIONS

This application is a U.S. national phase filing claiming the benefit of and priority to International Patent Application No. PCT/GB2020/050592, filed Mar. 11, 2020, which claims priority from and the benefit of United Kingdom patent application No. 1903213.5 filed on Mar. 11, 2019 and United Kingdom patent application No. 1903214.3 filed on Mar. 11, 2019. The entire contents of these applications are incorporated herein by reference.

FIELD OF THE INVENTION

The present invention relates generally to quadrupole devices and analytical instruments such as mass and/or ion mobility spectrometers that comprise quadrupole devices, and in particular to quadrupole mass filters and analytical instruments that comprise quadrupole mass filters.

BACKGROUND

Quadrupole mass filters are well known and comprise four parallel rod electrodes. FIG. 1 shows a typical arrangement of a quadrupole mass filter.

In conventional operation, an RF voltage and a DC voltage are applied to the rod electrodes of the quadrupole so that the quadrupole operates in a mass or mass to charge ratio resolving mode of operation. Ions having mass to charge ratios within a desired mass to charge ratio range will be onwardly transmitted by the mass filter, but undesired ions having mass to charge ratio values outside of the mass to charge ratio range will be substantially attenuated.

The drive voltages are selected such that the quadrupole device is operated in one of one or more so-called “stability regions”, that is, such that at least some ions will assume a stable trajectory in the quadrupole device. For example, it is common for quadrupole devices to be operated in the so-called “first” (that is, lowest order) stability region.

U.S. Pat. No. 5,227,629 describes a mode of operation in which a single additional quadrupolar AC perturbation voltage is applied to the electrodes of a quadrupole (in addition to the main RF and DC voltages). This has the effect of altering the stability diagram such that new stability regions or “islands of stability” are produced. Operation in this mode of operation can offer high mass resolution.

The article N. V. Konenkov et al., International Journal of Mass Spectrometry 208 (2001) 17-27 (Konenkov), describes these modified stability diagrams in greater detail.

The article M. Sudakov et al., International Journal of Mass Spectrometry 408 (2016) 9-19 (Sudakov), describes a mode of operation in which two additional phase locked AC excitations are applied to the rod electrodes of a quadrupole (in addition to the main RF and DC voltages). This has the effect of creating a narrow and long band of stability along the high q boundary near the top of the first stability region (the “X-band”). Operation in the X-band mode can offer high mass resolution and fast mass separation.

It is desired to provide an improved quadrupole device.

SUMMARY

According to an aspect, there is provided a method of operating a quadrupole device, the method comprising:

- applying a main quadrupolar voltage to the quadrupole device;
- applying an auxiliary quadrupolar voltage to the quadrupole device; and
- applying a dipolar voltage to the quadrupole device.

Various embodiments are directed to a method of operating a quadrupole device, such as a quadrupole mass filter, in which a main (AC or RF) quadrupolar voltage and an auxiliary (AC or RF) quadrupolar voltage are (simultaneously) applied to the quadrupole device.

Thus, for example, according to various embodiments, a repeating (AC or RF) quadrupolar voltage waveform comprising the main (AC or RF) and auxiliary (AC or RF) quadrupolar voltages is applied to the quadrupole device by applying a first phase of the repeating (AC or RF) quadrupolar voltage waveform to one pair of opposing electrodes of the quadrupole device, and applying the opposite phase of the repeating (AC or RF) quadrupolar voltage waveform (180° out of phase) to the other pair of opposing electrodes.

In addition to the main quadrupolar (AC or RF) and auxiliary (AC or RF) quadrupolar voltages, a dipolar (AC or RF) voltage is also applied to the quadrupole device (simultaneously with the main and auxiliary quadrupolar voltages).

Thus, for example, according to various embodiments, a repeating (AC or RF) dipolar voltage waveform comprising the (AC or RF) dipolar voltage is applied to the quadrupole device by applying a first phase of the repeating (AC or RF) dipolar voltage waveform to one of the electrodes of the quadrupole device, and the opposite phase of the repeating (AC or RF) dipolar voltage waveform (180° out of phase) to the opposite electrode of the quadrupole device (or by applying the first phase of the repeating (AC or RF) dipolar voltage waveform to one pair of adjacent electrodes of the quadrupole device, and the opposite phase of the repeating (AC or RF) dipolar voltage waveform (180° out of phase) to the other pair of adjacent electrodes).

As will be described in more detail below, the application of an auxiliary (AC or RF) quadrupolar voltage to the quadrupole device can allow the quadrupole device to operate in a mode of operation having improved performance characteristics (such as high mass resolution and fast mass separation), such as in an “X-band”, “X-band-like”, “Y-band”, or “Y-band-like” mode of operation.

However, where, as in the various embodiments described herein, only a single auxiliary quadrupolar voltage is applied to the quadrupole device, operating the quadrupole device in such a mode of operation can result in the undesirable simultaneous transmission by the quadrupole device of ions within two separate mass to charge ratio ranges. This is because in these modes of operation the so-called “scan line” may overlap with multiple different stability regions.

According to various embodiments, the additional (AC or RF) dipolar voltage is applied to the quadrupole device so as to prevent the transmission of undesired ions which may otherwise be transmitted by the quadrupole device when operating in this (“single auxiliary excitation X-band” or “single auxiliary excitation Y-band”) mode of operation.

As will be described in more detail below, the application of a (AC or RF) dipolar voltage to the quadrupole device in this manner represents a particularly convenient technique for preventing the transmission of these undesired ions and may be achieved in a relatively straightforward manner, without significantly increasing device complexity, and so without significantly increasing device cost.

Thus, various embodiments provide a mode of operation in which the benefits of X-band(-like) (or Y-band(-like)) operation, e.g. in terms of high mass resolution and fast mass separation can be achieved, while ensuring that only ions within a single (desired) mass to charge ratio window are transmitted by the quadrupole device in a particularly straightforward and convenient manner.

It will be appreciated, therefore, that the present invention provides an improved quadrupole device.

The method may comprise applying one or more DC voltages to the quadrupole device (simultaneously with the main quadrupolar, auxiliary quadrupolar and auxiliary dipolar voltages).

The main quadrupolar voltage, the auxiliary quadrupolar voltage and the one or more DC voltages may be selected to correspond to operation of the quadrupole device in two or more stability regions simultaneously. That is, the main quadrupolar voltage, the auxiliary quadrupolar voltage and the one or more DC voltages may be selected such that when only the main quadrupolar voltage, the auxiliary quadrupolar voltage and the one or more DC voltages are applied (simultaneously) to the quadrupole device (without applying the dipolar voltage), ions having mass to charge ratios within at least two different mass to charge ratios ranges (each range corresponding to a respective one of the two or more stability regions) are stable within (can assume stable trajectories in) the quadrupole device simultaneously (and so can be transmitted by the quadrupole device (simultaneously)). In other words, the main quadrupolar voltage, the auxiliary quadrupolar voltage and the one or more DC voltages may be selected such that the scan line crosses two or more stability regions.

The (or each) (AC or RF) dipolar voltage may be selected such that applying the (AC or RF) dipolar voltage to the quadrupole device causes ions corresponding to at least one (respective stability region) of the two or more stability regions to be attenuated (as those ions pass through the quadrupole device).

According to another aspect, there is provided a method of operating a quadrupole device, the method comprising:

- applying a main quadrupolar voltage to the quadrupole device;
- applying an auxiliary quadrupolar voltage to the quadrupole device; and
- applying one or more DC voltages to the quadrupole device;
- wherein the main quadrupolar voltage, the auxiliary quadrupolar voltage and the one or more DC voltages are selected to correspond to operation of the quadrupole device in two or more stability regions simultaneously;
- the method further comprising:
- attenuating ions corresponding to at least one of the two or more stability regions as those ions pass through the quadrupole device.

Attenuating ions corresponding to at least one of the two or more stability regions as those ions pass through the quadrupole device may comprise applying one or more (AC or RF) voltages to the quadrupole device (simultaneously with the main (AC or RF) quadrupolar voltage, auxiliary (AC or RF) quadrupolar voltage and one or more DC voltages). The one or more (AC or RF) voltages may comprise one or more (AC or RF) dipolar voltages.

Ions (corresponding to at least one of the two or more stability regions) may be attenuated by (the application of the dipolar voltage(s) to the quadrupole device) causing the radial amplitudes of at least some (for example all) of the ions to increase as the ions pass through the quadrupole device.

Ions (corresponding to at least one of the two or more stability regions) may be attenuated by (the application of the dipolar voltage(s) to the quadrupole device) causing at least some (for example all) of the ions to hit one or more electrodes of the quadrupole device, and/or to pass radially out of the quadrupole device (between electrodes of the quadrupole device), and/or to be otherwise attenuated (not transmitted) by the quadrupole device (to a downstream device).

The (AC or RF) dipolar voltage may be configured to attenuate ions corresponding to a stability region or stability regions of the two or more stability regions other than a single selected stability region.

At least one of the two or more stability regions may be an X-band, X-band-like, Y-band or Y-band-like stability region. Thus, instability (ejection) at stability boundaries of at least one of the two or more stability regions may be in (only) a single (x- or y-) direction.

The single selected stability region may be an X-band, X-band-like, Y-band or Y-band-like stability region. That is, the single selected stability region may be a stability region for which instability (ejection) at stability boundaries of the stability region may be in (only) a single (x- or y-) direction.

The method may comprise attenuating ions corresponding to each of the two or more stability regions other than a (single) X-band, X-band-like, Y-band or Y-band-like stability region. This may be done by selecting the (AC or RF) dipolar voltage(s) such that applying the (AC or RF) dipolar voltage(s) to the quadrupole device causes ions corresponding to each of the two or more stability regions other than the (single) X-band, X-band-like, Y-band or Y-band-like stability region, to be attenuated.

The quadrupole device may transmit (only) ions corresponding to (only) the (single) X-band, X-band-like, Y-band or Y-band-like stability region. That is, the quadrupole device may transmit (only) ions corresponding to (only) the (single) stability region for which instability (ejection) at stability boundaries of the stability region is in (only) a single (x- or y-) direction.

Only a single auxiliary quadrupolar voltage may be applied to the quadrupole device.

The (single) X-band, X-band-like, Y-band or Y-band-like stability region may be a “single excitation X-band” (or a “single excitation Y-band”) stability region. That is, the (single) X-band, X-band-like, Y-band or Y-band-like stability region may be produced by applying only a single auxiliary quadrupolar voltage to the quadrupole device (in addition to the main quadrupolar voltage).

At least one (for example each) of the main quadrupolar voltage, auxiliary quadrupolar voltage and dipolar voltage(s) may comprise a digital voltage.

At least one (for example each) of the main quadrupolar voltage, the auxiliary quadrupolar voltage and the dipolar voltage(s) may comprise a harmonic (RF or AC) voltage.

The quadrupole device may comprise four (parallel) (rod) electrodes, and each voltage may be applied to at least one, such as to two or to all (four), of the four electrodes.

Applying the main (AC or RF) quadrupolar voltage waveform to the quadrupole device may comprise applying the main (AC or RF) quadrupolar voltage waveform to at least one, such as to two or to all (four), of the (four) electrodes of the quadrupole device.

Applying the auxiliary (AC or RF) quadrupolar voltage to the quadrupole device may comprise applying the auxiliary (AC or RF) quadrupolar voltage to at least one, such as to two or to all (four), of the (four) electrodes of the quadrupole device.

Applying the (or each) (AC or RF) dipolar voltage to the quadrupole device may comprise applying the (AC or RF) dipolar voltage to at least one, such as to two or to all (four), of the (four) electrodes of the quadrupole device.

Applying the one or more DC voltages to the quadrupole device may comprise applying (each of) the one or more DC voltages to at least one, such as to two or to all (four), of the (four) electrodes of the quadrupole device.

The four electrodes of the quadrupole device may be arranged as two pairs of opposing electrodes. The four electrodes may accordingly be grouped into two pairs of adjacent electrodes, with each pair of adjacent electrodes comprising only one electrode of each pair of opposing electrodes.

Applying the main (AC or RF) quadrupolar voltage to the quadrupole device and/or applying the auxiliary (AC or RF) quadrupolar voltage to the quadrupole device may comprise applying a first phase of a repeating (AC or RF) quadrupolar voltage waveform to (each electrode of) one pair of opposing electrodes of the quadrupole device, and applying the opposite phase of the repeating (AC or RF) quadrupolar voltage waveform (180° out of phase) to (each electrode of) the other pair of opposing electrodes.

Additionally or alternatively, applying the main (AC or RF) quadrupolar voltage to the quadrupole device and/or applying the auxiliary (AC or RF) quadrupolar voltage to the quadrupole device may comprise applying a first phase of a repeating (AC or RF) quadrupolar voltage waveform to (each electrode of) only one of the pairs of opposing electrodes of the quadrupole device (and not applying (any phase of) the repeating quadrupolar voltage waveform to (each electrode of) the other pair of opposing electrodes of the quadrupole device).

Applying the (or each) (AC or RF) dipolar voltage to the quadrupole device may comprise applying a first phase of a repeating (AC or RF) dipolar voltage waveform to (each electrode of) one pair of adjacent electrodes of the quadrupole device, and applying the opposite phase of the repeating (AC or RF) dipolar voltage waveform (180° out of phase) to (each electrode of) the other pair of adjacent electrodes.

Additionally or alternatively, applying the (or each) (AC or RF) dipolar voltage to the quadrupole device may comprise applying a first phase of a repeating (AC or RF) dipolar voltage waveform to only one electrode of the quadrupole device, and applying the opposite phase of the repeating (AC or RF) dipolar voltage waveform (180° out of phase) to (only) the opposing electrode of the quadrupole device (and not applying (any phase of) the repeating dipolar voltage waveform to the other (two) electrodes of the quadrupole device).

The quadrupole device may comprise a quadrupole mass filter.

The method may comprise operating the quadrupole mass filter such that ions are selected and/or filtered according to their mass to charge ratio.

The method may comprise altering (such as scanning) the mass to charge ratio or the (centre of the) mass to charge ratio range at which ions are selected and/or transmitted by the quadrupole device. That is, the method may comprise altering the set mass of the quadrupole device.

The method may comprise altering the resolution of the quadrupole device. This may be done in dependence on the mass to charge ratio or the (centre of the) mass to charge ratio range at which ions are selected and/or transmitted by the quadrupole device (that is, in dependence on the set mass of the quadrupole device).

The method may comprise:

- increasing the resolution of the quadrupole device while increasing the mass to charge ratio or the (centre of the the) mass to charge ratio range at which ions are selected and/or transmitted by the quadrupole device (that is, while increasing the set mass of the quadrupole device); or
- decreasing the resolution of the quadrupole device while decreasing the mass to charge ratio or the (centre of the the) mass to charge ratio range at which ions are selected and/or transmitted by the quadrupole device (that is, while decreasing the set mass of the quadrupole device).

As used herein, the set mass of the quadrupole device is the mass to charge ratio or the centre of the mass to charge ratio range at which ions are selected and/or transmitted by the quadrupole device.

The method may comprise altering the resolution of the quadrupole device so as to maintain a constant peak width for different mass to charge ratios or mass to charge ratio ranges (that is, for different set masses).

The method may comprise altering the resolution of the quadrupole device by altering the amplitude and/or frequency of the main quadrupolar voltage and/or auxiliary quadrupolar voltage and/or dipolar voltage.

According to an aspect there is provided a method of mass and/or ion mobility spectrometry, comprising the method described above.

According to another aspect, there is provided apparatus comprising:

- a quadrupole device; and
- one or more voltage sources configured to:
- apply a main quadrupolar voltage to the quadrupole device;
- apply an auxiliary quadrupolar voltage to the quadrupole device; and
- apply a dipolar voltage to the quadrupole device.

The one or more voltage sources may be configured to apply one or more DC voltages to the quadrupole device (simultaneously with the main (AC or RF) quadrupolar, auxiliary (AC or RF) quadrupolar and auxiliary (AC or RF) dipolar voltages).

The main (AC or RF) quadrupolar voltage, the auxiliary (AC or RF) quadrupolar voltage and the one or more DC voltages may be selected to correspond to operation of the quadrupole device in two or more stability regions simultaneously. In other words, the main quadrupolar voltage, the auxiliary quadrupolar voltage and the one or more DC voltages may be selected such that the scan line crosses two or more stability regions.

The (or each) (AC or RF) dipolar voltage may be selected such that applying the (AC or RF) dipolar voltage to the quadrupole device causes ions corresponding to at least one (respective stability region) of the two or more stability regions to be attenuated (as those ions pass through the quadrupole device).

According to another aspect, there is provided apparatus comprising:

- a quadrupole device; and
- one or more voltage sources configured to:
- apply a main quadrupolar voltage to the quadrupole device;
- apply an auxiliary quadrupolar voltage to the quadrupole device; and apply one or more DC voltages to the quadrupole device;

wherein the main quadrupolar voltage, the auxiliary quadrupolar voltage and the one or more DC voltages are selected to correspond to operation of the quadrupole device in two or more stability regions simultaneously; and wherein the apparatus is configured to attenuate ions corresponding to at least one of the two or more stability regions as those ions pass through the quadrupole device.

The one or more voltage sources may be configured to apply one or more (AC or RF) voltages to the quadrupole device (simultaneously with the main (AC or RF) quadrupolar voltage, auxiliary (AC or RF) quadrupolar voltage and one or more DC voltages) so as to attenuate ions corresponding to at least one of the two or more stability regions as those ions pass through the quadrupole device. The one or more (AC or RF) voltages may comprise one or more (AC or RF) dipolar voltages.

The apparatus may be configured to attenuate ions (corresponding to at least one of the two or more stability regions) by (the application of the (AC or RF) dipolar voltage(s) to the quadrupole device) causing the radial amplitudes of at least some (for example all) of the ions to increase as the ions pass through the quadrupole device.

The apparatus may be configured to attenuate ions (corresponding to at least one of the two or more stability regions) by (the application of the (AC or RF) dipolar voltage(s) to the quadrupole device) causing at least some (for example all) of the ions to hit one or more electrodes of the quadrupole device, and/or to pass radially out of the quadrupole device (between electrodes of the quadrupole device), and/or to be otherwise attenuated (not transmitted) by the quadrupole device (to a downstream device).

The (AC or RF) dipolar voltage may be configured to attenuate ions corresponding to a stability region or stability regions of the two or more stability regions other than a single selected stability region.

At least one of the two or more stability regions may be an X-band, X-band-like, Y-band or Y-band-like stability region. Thus, instability (ejection) at stability boundaries of at least one of the two or more stability regions may be in (only) a single (z- or y-) direction.

The single selected stability region may be an X-band, X-band-like, Y-band or Y-band-like stability region. That is, the single selected stability region may be a stability region for which instability (ejection) at stability boundaries of the stability region may be in (only) a single (x- or y-) direction.

The apparatus may be configured to attenuate ions corresponding to each of the two or more stability regions other than a (single) X-band, X-band-like, Y-band or Y-band-like stability region. The (AC or RF) dipolar voltage(s) may be selected such that applying the (AC or RF) dipolar voltage(s) to the quadrupole device causes ions corresponding to each of the two or more stability regions other than the (single) X-band, X-band-like, Y-band or Y-band-like stability region, to be attenuated.

The apparatus may be configured such that the quadrupole device transmits (only) ions corresponding to (only) the (single) X-band, X-band-like, Y-band or Y-band-like stability region. That is, the apparatus may be configured such that the quadrupole device transmits (only) ions corresponding to (only) the (single) stability region for which instability (ejection) at stability boundaries of the stability region is in (only) a single (x- or y-) direction.

The one or more voltages sources may be configured to apply only a single auxiliary (AC or RF) quadrupolar voltage to the quadrupole device.

The (single) X-band, X-band-like, Y-band or Y-band-like stability region may be a "single excitation X-band" (or a "single excitation Y-band") stability region. That is, the single X-band, X-band-like, Y-band or Y-band-like stability region may be produced by applying only a single auxiliary (AC or RF) quadrupolar voltage to the quadrupole device.

At least one (for example each) of the one or more voltages sources may comprise a digital voltage source.

At least one (for example each) of the one or more voltage sources may comprise a harmonic (RF or AC) voltage source.

The quadrupole device may comprise four (parallel) (rod) electrodes, and the one of more voltages sources may be configured to apply each voltage (waveform) to at least one, such as to two or to all (four), of the four electrodes.

The one of more voltages sources may be configured to apply the main (AC or RF) quadrupolar voltage to the quadrupole device by applying the main (AC or RF) quadrupolar voltage to at least one, such as to two or to all (four), of the (four) electrodes of the quadrupole device.

The one of more voltages sources may be configured to apply the auxiliary (AC or RF) quadrupolar voltage to the quadrupole device by applying the auxiliary (AC or RF) quadrupolar voltage to at least one, such as to two or to all (four), of the (four) electrodes of the quadrupole device.

The one of more voltages sources may be configured to apply the (or each) (AC or RF) dipolar voltage to the quadrupole device by applying the (AC or RF) dipolar voltage to at least one, such as to two or to all (four), of the (four) electrodes of the quadrupole device.

The one of more voltages sources may be configured to apply the one or more DC voltages to the quadrupole device by applying (each of) the one or more DC voltages to at least one, such as to two or to all (four), of the (four) electrodes of the quadrupole device.

The four electrodes of the quadrupole device may be arranged as two pairs of opposing electrodes. The four electrodes may accordingly be grouped into two pairs of adjacent electrodes, with each pair of adjacent electrodes comprising only one electrode of each pair of opposing electrodes.

The one of more voltages sources may be configured to apply the main (AC or RF) quadrupolar voltage and/or the auxiliary (AC or RF) quadrupolar voltage to the quadrupole device by applying a first phase of a repeating (AC or RF) quadrupolar voltage waveform to (each electrode of) one pair of opposing electrodes of the quadrupole device, and applying the opposite phase of the repeating (AC or RF) quadrupolar voltage waveform (180° out of phase) to (each electrode of) the other pair of opposing electrodes.

Additionally or alternatively, the one of more voltages sources may be configured to apply the main (AC or RF) quadrupolar voltage and/or the auxiliary (AC or RF) quadrupolar voltage to the quadrupole device by applying a first phase of a repeating (AC or RF) quadrupolar voltage waveform to (each electrode of) only one of the pairs of opposing electrodes of the quadrupole device (and not applying (any phase of) the repeating quadrupolar voltage waveform to (each electrode of) the other pair of opposing electrodes of the quadrupole device).

The one of more voltages sources may be configured to apply the (or each) (AC or RF) dipolar voltage to the quadrupole device by applying a first phase of a repeating (AC or RF) dipolar voltage waveform to (each electrode of)

one pair of adjacent electrodes of the quadrupole device, and applying the opposite phase of the repeating (AC or RF) dipolar voltage waveform (180° out of phase) to (each electrode of) the other pair of adjacent electrodes.

Additionally or alternatively, the one of more voltages sources may be configured to apply the (or each) (AC or RF) dipolar voltage to the quadrupole device by applying a first phase of a repeating (AC or RF) dipolar voltage waveform to only one electrode of the quadrupole device, and applying the opposite phase of the repeating (AC or RF) dipolar voltage waveform (180° out of phase) to (only) the opposing electrode of the quadrupole device (and not applying (any phase of) the repeating dipolar voltage waveform to the other (two) electrodes of the quadrupole device).

The quadrupole device may comprise a quadrupole mass filter.

The apparatus may be configured such that the quadrupole mass filter operates such that ions are selected and/or filtered according to their mass to charge ratio.

The apparatus may be configured to alter (such as scan) the mass to charge ratio or the (centre of the) mass to charge ratio range at which ions are selected and/or transmitted by the quadrupole device. That is, the control system may be configured to alter the set mass of the quadrupole device.

The apparatus may be configured to alter the resolution of the quadrupole device. This may be done in dependence on the mass to charge ratio or mass to charge ratio range at which ions are selected and/or transmitted by the quadrupole device (that is, in dependence on the set mass of the quadrupole device).

The apparatus may be configured to:

- increase the resolution of the quadrupole device while increasing the mass to charge ratio or the (centre of the) mass to charge ratio range at which ions are selected and/or transmitted by the quadrupole device (that is, while increasing the set mass of the quadrupole device); or
- decrease the resolution of the quadrupole device while decreasing the mass to charge ratio or the (centre of the) mass to charge ratio range at which ions are selected and/or transmitted by the quadrupole device (that is, while decreasing the set mass of the quadrupole device).

The set mass of the quadrupole device may be the mass to charge ratio or the centre of the mass to charge ratio range at which ions are selected and/or transmitted by the quadrupole device.

The apparatus may be configured to alter the resolution of the quadrupole device so as to maintain a constant peak width for different mass to charge ratios or mass to charge ratio ranges.

The apparatus may be configured to alter the resolution of the quadrupole device by altering the amplitude and/or frequency of the main quadrupolar voltage and/or auxiliary quadrupolar voltage and/or dipolar voltage.

According to an aspect there is provided a mass and/or ion mobility spectrometer, comprising the apparatus described above.

According to an aspect there is provided a method comprising:

- providing a first quadrupole ion guide comprising first and second pairs of opposing electrodes;
- applying a first main or drive AC voltage with amplitude V and frequency ω between the first and second pairs of opposing electrodes;
- applying a DC voltage U between the first and second pairs of opposing electrodes; and
- applying a second, parametric excitation AC voltage with amplitude $V_{ex}$ and frequency $\omega_{ex}$ between the first and second pairs of opposing electrodes, wherein $V>V_{ex}$ and $\omega\neq\omega_{ex}$ such that in operation more than one different mass to charge ratio region is simultaneously transmitted;
- wherein ions within some of said simultaneously transmitted mass to charge ratio ranges are prevented from being transmitted as they traverse the quadrupole ion guide.

The means of preventing transmission of the ions may be provided by application of one or more dipole excitation waveforms to the first quadrupole ion guide.

According to various embodiments, a single quadrupolar excitation waveform is applied in addition to confining RF and resolving DC voltages to alter the stability diagram of a quadrupole device.

In operation, the DC/RF ratio may be adjusted such that more than one mass to charge ratio region or window is simultaneously transmitted by the quadrupole device.

At least one of the transmitted mass to charge ratio regions may originate from a region of ion stability which results in improved peak shape, abundance sensitivity and resolution-transmission characteristics.

Ions from mass to charge ratio ranges which are not desired to be transmitted may be prevented from exiting the quadrupole device or prevented from being onwardly transmitted by application of a separate dipole excitation waveform, or waveforms, at one or more frequencies that may be different to the frequency of the quadrupolar excitation(s).

The dipole excitation waveform may be used to increase the radial amplitude of unwanted ions as they traverse the quadrupole device such that they hit the electrodes, are ejected between or through the electrodes or are perturbed sufficiently on exit that they are unable to be transmitted or detected by a downstream device. Hence, the quadrupole device may allow only a single mass to charge ratio range to be transmitted.

BRIEF DESCRIPTION OF THE DRAWINGS

Various embodiments will now be described, by way of example only, and with reference to the accompanying drawings in which.

DETAILED DESCRIPTION

Various embodiments are directed to a method of operating a quadrupole device, such as a quadrupole mass filter.

Figure 1:
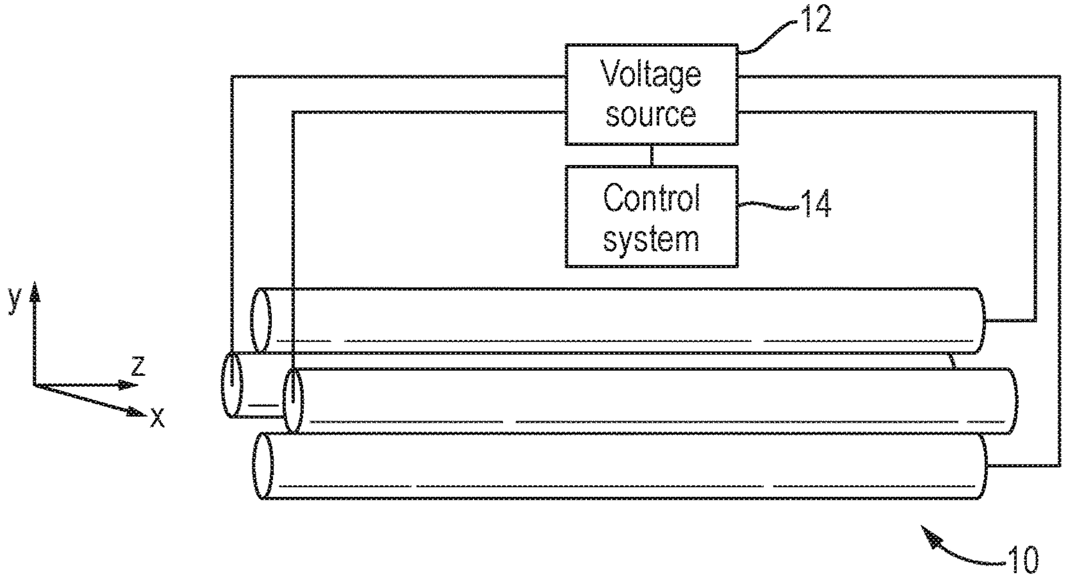
FIG. 1 shows schematically a quadrupole mass filter in accordance with various embodiments.

As illustrated schematically in FIG. 1, the quadrupole device 10 may comprise a plurality of electrodes such as four electrodes, for example rod electrodes, which may be arranged to be parallel to one another. The quadrupole device may comprise any suitable number of other electrodes (not shown).

The rod electrodes may be arranged so as to surround a central (longitudinal) axis of the quadrupole (z-axis) (that is, that extends in an axial (z) direction) and to be parallel to the axis (parallel to the axial- or z-direction).

Each rod electrode may be relatively extended in the axial (z) direction. Plural or all of the rod electrodes may have the same length (in the axial (z) direction). The length of one or more or each of the rod electrodes may have any suitable value, such as for example (i)<100 mm; (ii) 100-120 mm; (iii) 120-140 mm; (iv) 140-160 mm; (v) 160-180 mm; (vi) 180-200 mm; or (vii)>200 mm.

Plural or all of the rod electrodes may be aligned in the axial (z) direction.

Each of the plural extended electrodes may be offset in the radial (r) direction (where the radial direction (r) is orthogonal to the axial (z) direction) from the central axis of the ion guide by the same radial distance (the inscribed radius) $r_0$, but may have different angular (azimuthal) displacements (with respect to the central axis) (where the angular direction (θ) is orthogonal to the axial (z) direction and the radial (r) direction). The quadrupole inscribed radius $r_0$ may have any suitable value, such as for example (i)<3 mm; (ii) 3-4 mm; (iii) 4-5 mm; (iv) 5-6 mm; (v) 6-7 mm; (vi) 7-8 mm; (vii) 8-9 mm; (viii) 9-10 mm; or (ix)>10 mm.

Each of the plural extended electrodes may be equally spaced apart in the angular (θ) direction. As such, the electrodes may be arranged in a rotationally symmetric manner around the central axis. Each extended electrode may be arranged to be opposed to another of the extended electrodes in the radial direction. That is, for each electrode that is arranged at a particular angular displacement $\theta_n$ with respect to the central axis of the ion guide, another of the electrodes is arranged at an angular displacement $\theta_n \pm 180°$.

Thus, the quadrupole device 10 (for example, quadrupole mass filter) may comprise a first pair of opposing rod electrodes both placed parallel to the central axis in a first (x) plane, and a second pair of opposing rod electrodes both placed parallel to the central axis in a second (y) plane perpendicularly intersecting the first (x) plane at the central axis.

The quadrupole device 10 may be configured (in operation) such that at least some ions are confined within the ion guide in a radial (r) direction (where the radial direction is orthogonal to, and extends outwardly from, the axial direction). At least some ions may be radially confined substantially along (in close proximity to) the central axis. In use, at least some ions may travel though the ion guide substantially along (in close proximity to) the central axis.

As will be described in more detail below, in various embodiments (in operation) plural different voltages are applied to the electrodes of the quadrupole device 10, for example, by one or more voltage sources 12. One or more or each of the one or more voltage sources 12 may comprise an analogue voltage source and/or a digital voltage source.

As shown in FIG. 1, according to various embodiments, a control system 14 may be provided. The one or more voltage sources 12 may be controlled by the control system 14 and/or may form part of the control system 12. The control system may be configured to control the operation of the quadrupole 10 and/or voltage source(s) 12, for example, in the manner of the various embodiments described herein. The control system 14 may comprise suitable control circuitry that is configured to cause the quadrupole 10 and/or voltage source(s) 12 to operate in the manner of the various embodiments described herein. The control system may also comprise suitable processing circuitry configured to perform any one or more or all of the necessary processing and/or post-processing operations in respect of the various embodiments described herein.

The electrodes of one (or both) pair of electrodes of the quadrupole device 10 may be electrically connected and/or may be provided with one or more same voltage(s) (although, this need not be the case). For example, each pair of opposing electrodes of the quadrupole device 10 may be electrically connected and/or may be provided with one or more same voltage(s). A first phase of one or more or each (RF or AC) quadrupolar voltage may be applied to one of the pairs of opposing electrodes, and the opposite phase of that voltage (180° out of phase) may be applied to the other pair of electrodes. Additionally or alternatively, one or more or each (RF or AC) quadrupolar voltage may be applied to only one of the pairs of opposing electrodes. In addition, a DC potential difference may be applied between the two pairs of opposing electrodes, for example, by applying one or more DC voltages to one or both of the pairs of electrodes.

Thus, the one or more voltage sources 12 may comprise one or more (RF or AC) drive voltage sources that may each be configured to provide one or more quadrupolar (RF or AC) drive voltages between the two pairs of opposing rod electrodes. In addition, the one or more voltage sources 12 may comprise one or more DC voltage sources that may be configured to supply a DC potential difference between the two pairs of opposing rod electrodes.

In addition, and as will be described in more detail below, the one or more voltage sources 12 may comprise one or more drive voltage sources that may each be configured to provide one or more dipolar drive voltages to one or both of the pairs of opposing rod electrodes.

The plural voltages that are applied to (the electrodes of) the quadrupole device 10 may be selected such that ions within (for example, travelling through) the quadrupole device 10 having a desired mass to charge ratio or having mass to charge ratios within a desired mass to charge ratio range will assume stable trajectories (that is, will be radially or otherwise confined) within the quadrupole device 10, and will therefore be retained within the device and/or onwardly transmitted by the device. Ions having mass to charge ratio values other than the desired mass to charge ratio or outside of the desired mass to charge ratio range may assume unstable trajectories in the quadrupole device 10, and may therefore be lost and/or substantially attenuated. Thus, the plural voltages that are applied to the quadrupole device 10 may be configured to cause ions within the quadrupole device 10 to be selected and/or filtered according to their mass to charge ratio.

As described above, in conventional ("normal") operation, mass or mass to charge ratio selection and/or filtering is achieved by applying a single quadrupolar RF voltage and a resolving DC voltage to the electrodes of the quadrupole device 10.

In this case, the total applied potential $V_n(t)$ can be expressed as:

$$V_n(t)=U-V_{RF}\cos(\Omega t), \quad (1)$$

where U is the amplitude of the applied resolving DC potential, $V_{RF}$ is the amplitude of the main quadrupolar RF waveform, and Ω is the frequency of the main quadrupolar RF waveform.

As also described above, applying a single quadrupolar AC excitation voltage to a quadrupole device 10 in addition to the confining RF and resolving DC voltages can alter the stability diagram such that new regions of stability or "islands of stability" are produced.

Figure 2:
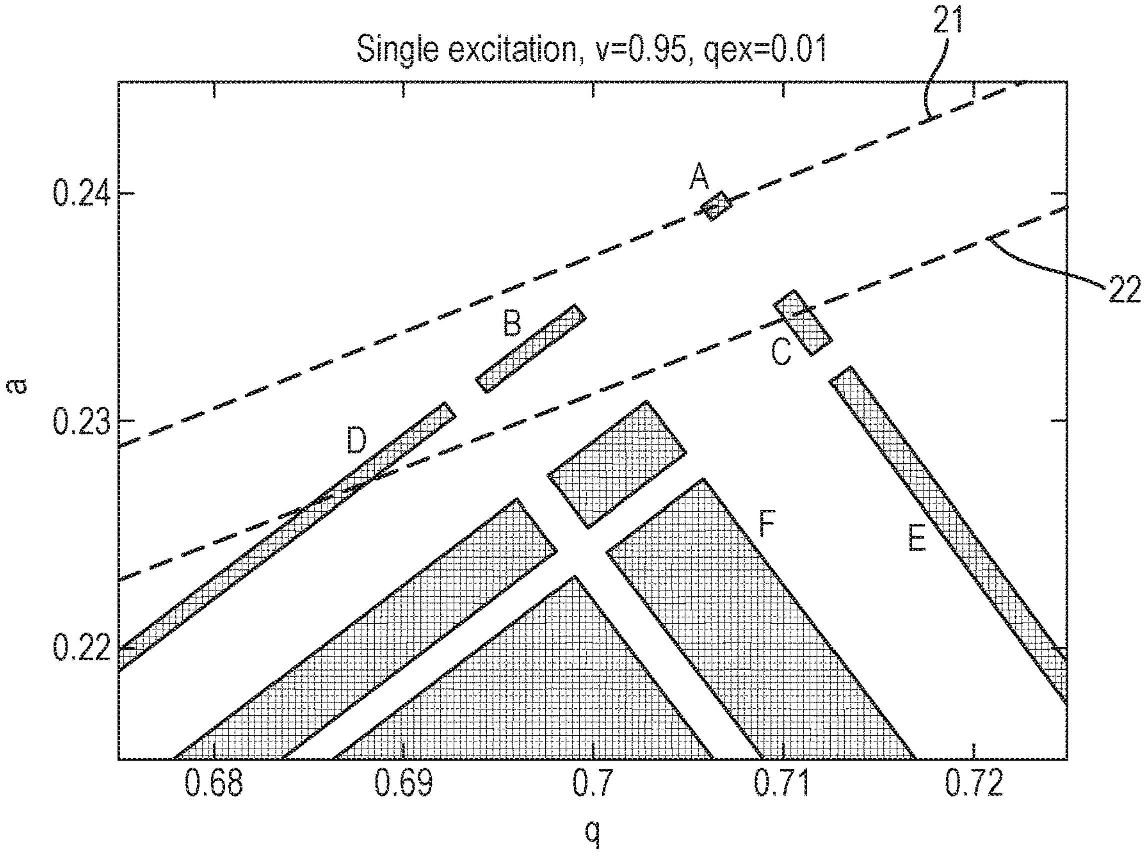
FIG. 2 shows a stability diagram for a quadrupole mass filter operating in a mode of operation in which a single auxiliary quadrupolar excitation waveform is applied to the quadrupole mass filter.

This is illustrated by FIG. 2. FIG. 2 shows the tip of the stability diagram (in a, q dimensions) resulting from the application of a single auxiliary quadrupolar excitation waveform of the form $V_{ex}\cos(\omega_{ex}t)$ to the quadrupole device 10 (in addition to the main quadrupolar RF and DC voltages (according to Equation 1)).

For operation of the quadrupole device 10 in this mode, the total applied quadrupolar potential $V_{xb}(t)$ can be expressed as:

$$V_{xb}(t)=U-V_{RF}\cos(\Omega t)-V_{ex}\cos(\omega_{ex}t+\alpha_{ex}), \quad (2)$$

where U is the amplitude of the applied resolving DC potential, $V_{RF}$ is the amplitude of the main quadrupolar RF waveform, Ω is the frequency of the main quadrupolar RF waveform, $V_{ex}$ is the amplitude of the auxiliary quadrupolar waveform, $\omega_{ex}$ is the frequency of the auxiliary quadrupolar waveform, and $\alpha_{ex}$ is the initial phase of the auxiliary quadrupolar waveform with respect to the phase of the main quadrupolar RF voltage.

The dimensionless parameters for the auxiliary waveform, $q_{ex}$, a, and q may be defined as:

$$q_{ex}=\frac{4eV_{ex}}{M\Omega^2 r_0^2},$$

$$a=\frac{8eU}{M\Omega^2 r_0^2}, \text{ and}$$

$$q=\frac{4eV_{RF}}{M\Omega^2 r_0^2},$$

where M is the ion mass and e is its charge.

The frequency $\omega_{ex}$ of the auxiliary quadrupolar excitation may be expressed as a fraction of the main confining RF frequency Ω in terms of a dimensionless base frequency v:

$$\omega_{ex}=v\Omega.$$

Suitable values for v may be between around 1/6 and 1/40, in embodiments between around 1/10 and 1/20. Suitable values for $q_{ex}$ may be around 0.1 or less (or more). $q_{ex}$ may be selected to give a desired resolution. In the example depicted in FIG. 2, v=0.95 and $q_{ex}$=0.01.

According to various embodiments, the amplitude of the resolving DC potential U and the amplitude of the main quadrupole waveform $V_{RF}$ may be altered so that the ratio of the amplitude of the resolving DC potential to the amplitude of the main quadrupole waveform, 2 $U/V_{RF}$ (=a/q), is constant. The line corresponding to a fixed a/q ratio is defined as the so-called operating line, or "scan line".

As can be seen from FIG. 2, the application of the single auxiliary RF excitation results in the formation a number of different islands of stability. It may be desirable to operate the quadrupole device 10 in any one of these different islands of stability. For example, one or more of the islands of stability may exhibit X-band, X-band-like (or Y-band, or Y-band-like) properties. An X-band-like (or Y-band-like) stability region may comprise a stability region for which instability (ejection) at the stability boundaries of the stability region may be in only the x- (or y-) direction.

In FIG. 2, regions "A", "C" and "E" may be considered as being part of the "X-band" for this single auxiliary excitation mode of operation. Regions "B" and "D" may be considered as being part of the "Y-band". However, other region may also display X-band-like (or Y-band-like) properties. For example, the regions to the left of the X-band regions, such as region "F" may also display X-band-like properties. For such regions, the stability boundaries at either edge of a region may be x-direction (or y-direction) instabilities, and so it may have X-band-like (or Y-band-like) properties, and comparable acceptance. This may also be the case for other regions of stability shown and not shown in FIG. 2.

As can also be seen from FIG. 2, a first scan line 21 intersects a single island of stability, labelled "A". Scan line 22, however, intersects two different islands of stability, "C" and "D". This means that operating the quadrupole with scan line 21 may result in ions within only a single range of mass to charge ratio (m/z) values being transmitted by the quadrupole, while operating the quadrupole with scan line 22 may result in the simultaneous transmission of ions from two separate mass to charge ratio (m/z) ranges, which is undesirable. Furthermore, other scan lines can intersect three or more islands of stability.

Thus, in U.S. Pat. No. 5,227,629, the resolving DC voltage is selected such that only a single mass to charge ratio (m/z) range can be transmitted. That is, a scan line only intersecting region "A", such as scan line 21, is selected. Operation in such a mode of operation can improve peak shape and abundance sensitivity as compared to operation without an auxiliary excitation ("normal" operation). However, incorrect setting of the a/q (DC/RF) ratio can result, undesirably, in ions having mass to charge ratios within more than one mass to charge ratio (m/z) range being transmitted by the quadrupole.

It has been found that operating a quadrupole device 10 in any of regions "A", "C" or "E" (or further regions at lower a-values in the band "A"-"C"-"E" (not shown in FIG. 2)) can provide fast ejection of ions and improved mass filter performance, for example improved peak shape, as compared to operation in a conventional ("normal") mode. Furthermore, it has been found that operating a quadrupole in regions "C" or "E" (or further regions at lower a-values in the band "A"-"C"-"E") can provide a number of further advantages over operating the quadrupole in region "A".

In particular, operating a quadrupole in regions "C" or "E" (or further regions at lower a-values in the band "A"-"C"-"E") can result in the ejection of ions in the same direction (towards the same pair of opposing electrodes) at both the high and low q boundary. In contrast, in region "A", ejection does not occur in one direction only at the stability boundaries. Furthermore, transmission versus resolution is significantly inferior for a quadrupole device 10 operating in region "A" compared to the quadrupole device 10 operating in region "C" or "E" (or further regions at lower a-values in the band "A"-"C"-"E").

These desirable stability regions ("C", "E" and further regions at lower a-values in the band "A"-"C"-"E") may thus be characterised by instability at stability boundaries being in (only) a single direction, and may be referred to as "X-band" stability regions. In particular, since these regions ("C", "E" and further regions at lower a-values in the band "A"-"C"-"E") may be produced when only a single auxiliary quadrupolar excitation waveform is applied to the quadrupole device, they may be referred to as "single excitation X-band stability regions".

The inventors have recognised that it can be desirable to operate a quadrupole device 10 in a single excitation X-band stability region (for which instability at stability boundaries is in only a single direction). Such regions of stability include regions "C", "E" and further regions at lower a-values in the band "A"-"C"-"E", for example, as described above. Operation in each such X-band region of stability may provide improved peak shape, abundance sensitivity and resolution-transmission characteristics.

However, as discussed above, the inventors have found that when operating in such (desirable) X-band regions of stability, a scan line 22 may pass through one or more other (less desirable) regions of stability. For example, the scan line 22 may also pass through region "D", as described above.

Thus, the scan line 22 may pass through two (or more) regions of stability simultaneously, that is the quadrupole device 10 may operate in two (or more) regions of stability simultaneously (by appropriate selection of $V_{RF}$ and U). Operating a quadrupole device 10 in two (or more) regions of stability simultaneously can result in the simultaneous transmission of ions having mass to charge ratios within two separate mass to charge ratio (m/z) ranges, which is undesirable.

Accordingly, it is desired to operate a quadrupole device 10 in an X-band stability region, while avoiding the simultaneous transmission of ions corresponding to other (less desirable) stability regions or bands, such as region "D".

In other embodiments, it may be desired to operate a quadrupole device 10 in other types of stability region, such as X-band-like stability regions, Y-band stability regions or Y-band-like stability regions, such as any one of the stability regions shown in FIG. 2 and described above.

It would be possible, for example, to achieve such operation by removing undesired ions, for example corresponding to region "D", using an auxiliary mass filter (that is, using a mass filter in addition to (and which may be separate from) the main quadrupole device 10).

Figure 3A:
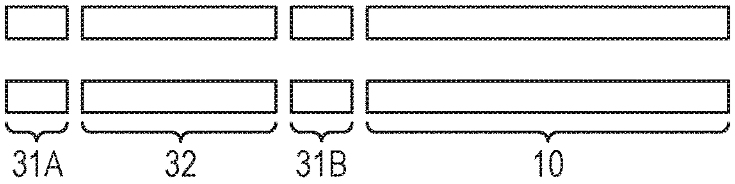
FIG. 3A shows schematically an arrangement in which an auxiliary mass filter is arranged upstream of an analytical quadrupole mass filter.
Figure 3B:
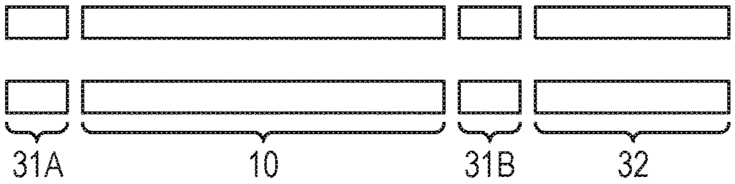
FIG. 3B shows schematically an arrangement in which an auxiliary mass filter is arranged downstream of an analytical quadrupole mass filter.

An example of this is shown in FIG. 3. FIG. 3A illustrates an arrangement in which an auxiliary mass filter 32 is arranged upstream of the main analytical quadrupole 10. FIG. 3B shows an alternative arrangement in which the auxiliary mass filter 32 is arranged downstream of the main analytical quadrupole 10.

In these examples, a single auxiliary AC (RF) quadrupolar excitation waveform may be applied to the main analytical quadrupole 10 (in addition to main RF and DC voltages), and the quadrupole 10 may be operated with a scan line intersecting regions "C" and "D", such as scan line 22 in FIG. 2. The auxiliary mass filter 32 may then be used to remove the unwanted ions corresponding to region "D", that is, such that the unwanted ions are not transmitted by the auxiliary mass filter 32.

As shown in FIG. 3, these arrangements may optionally also include RF only pre-filters 31A, 31B which can be used to help maintain ion transmission from a non-RF environment into an RF mass filter, or from one mass filter coupled to another mass filter having different filtering conditions.

Figure 4:
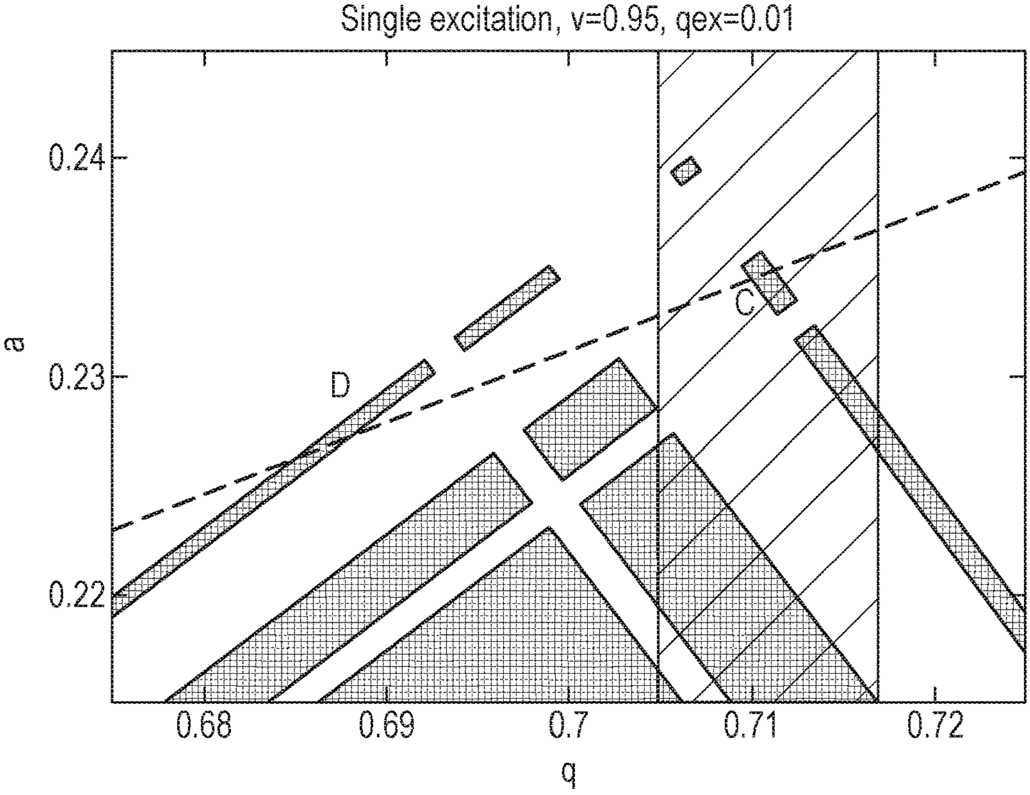
FIG. 4 illustrates the effects of a mass filter on the stability diagram of FIG. 2.

FIG. 4 illustrates the effect of the arrangements of FIG. 3 with respect to the stability diagram of FIG. 2.

In this example, the auxiliary mass filter 32 is arranged to operate as a band pass filter, and the shaded area in FIG. 4 represents the pass band (in q) of the auxiliary mass filter 32.

Ions corresponding to stability region "C" of the main analytical quadrupole 10 are within the pass band of the auxiliary mass filter 32, and so are transmitted by the auxiliary mass filter 32. Ions corresponding to stability region "D" of the main analytical quadrupole 10, however, are not within the pass band of the auxiliary mass filter 32, and so are not transmitted by the auxiliary mass filter 32.

Thus, in the arrangement of FIG. 3A, ions within stability region "D" will not reach the main analytical quadrupole 10, and so will not enter or be transmitted by the main analytical quadrupole 10. In the arrangement of FIG. 3B, ions within stability region "D" will be transmitted by the main analytical quadrupole 10, but then will be not transmitted by the auxiliary mass filter 32.

It will be appreciated that in these arrangements, the auxiliary mass filter 32 need not have the same performance characteristics as the main analytical quadrupole 10. That is, the performance of the auxiliary mass filter 32 can be inferior to the main analytical quadrupole 10. Accordingly, the auxiliary mass filter 32 can be a relatively low resolution device (compared to the main analytical quadrupole 10). Similarly, the auxiliary mass filter 32 can have a relatively short length and/or may be constructed with relatively relaxed mechanical tolerances (compared to the main analytical quadrupole 10). It will also be appreciated that the auxiliary mass filter 32 device could operate as a high mass cut off (high-pass) device rather than a band pass device.

However, the use of an auxiliary mass filter 32 in addition to a main analytical quadrupole 10 can increase device complexity, and so cost (as compared to not using an auxiliary mass filter 32). In particular hardware, electronics and associated control requirements will be greater. Moreover, it may not be possible to integrate an auxiliary mass filter 32 into existing quadrupole or instrument designs, without extensive (and so expensive) redesign.

Another way of achieving X-band operation while avoiding the simultaneous transmission of ions corresponding to other (less desirable) stability regions is to operate a quadrupole device 10 in a "two excitation X-band" mode of operation, for example as described in Sudakov. In this mode of operation two additional phase locked auxiliary quadrupolar AC excitations are applied to the quadrupole device 10 (in addition to main RF and DC voltages).

By precisely adjusting the relative frequencies and amplitudes of these two auxiliary quadrupolar excitation waveforms, and controlling the phase difference between them, the stability diagram can be altered in such a way that only a single mass to charge ratio (m/z) range is transmitted by the quadrupole device 10.

In particular, with an appropriate selection of the excitation frequencies and amplitudes of the two additional AC excitation waveforms, the influence of the two excitations can be mutually cancelled for ion motion in either the x or y direction, and a narrow and long band of stability can be created along the boundary near the top of the first stability region (the so-called "X-band" or "Y-band").

A quadrupole device can be operated in either the X-band mode or the Y-band mode, but operation in the X-band mode may be advantageous for mass filtering as it results in instability occurring in very few cycles of the main RF voltage, thereby providing several advantages including: fast mass separation, higher mass to charge ratio (m/z) resolution, tolerance to mechanical imperfections, tolerance to initial ion energy and surface charging due to contamination, and the possibility of miniaturizing or reducing the size of the quadrupole device.

For operation of a quadrupole device in the two excitation X-band mode, the total applied potential $V_{xb}(t)$ can be expressed as:

$$V_{xb}(t)=U-V_{RF}\cos(\Omega t)-V_{ex1}\cos(Q)_{ex1}t+\alpha_{ex1})+V_{ex2}\cos(\omega_{ex2}t+\alpha_{ex2}),$$

where U is the amplitude of the applied resolving DC potential, $V_{RF}$ is the amplitude of the main RF waveform, Ω is the frequency of the main RF waveform, $V_{ex1}$ and $V_{ex2}$ are the amplitudes of the first and second auxiliary quadrupolar waveforms, $\omega_{ex1}$ and $\omega_{ex2}$ are the frequencies of the first and second auxiliary quadrupolar waveforms, and $\alpha_{ex1}$ and $\alpha_{ex2}$ are the initial phases of the two auxiliary quadrupolar waveforms with respect to the phase of the main RF voltage.

The dimensionless parameters for the nth auxiliary quadrupolar waveform, $q_{ex(n)}$, a, and q may be defined as:

$$q_{ex(n)} = \frac{4eV_{ex(n)}}{M\Omega^2 r_0^2},$$

$$a = \frac{8eU}{M\Omega^2 r_0^2}, \text{ and}$$

$$q = \frac{4eV_{RF}}{M\Omega^2 r_0^2},$$

where M is the ion mass and e is its charge.

The phase offsets of the auxiliary quadrupolar waveforms $\alpha_{ex1}$ and $\alpha_{ex2}$ may be related to each other by:

$$\alpha_{ex2}=2\pi-\alpha_{ex1}.$$

Hence, the two auxiliary quadrupolar waveforms may be phase coherent (or phase locked), but free to vary in phase with respect to the main RF voltage.

The frequencies of the two parametric excitations $\omega_{ex1}$ and $\omega_{ex2}$ can be expressed as a fraction of the main confining RF frequency Ω in terms of a dimensionless base frequency v:

$$\omega_{ex1}=v_1\Omega, \text{ and } \omega_{ex2}=v_2\Omega.$$

Examples of possible excitation frequencies and relative excitation amplitudes ($q_{ex2}/q_{ex1}$) for two excitation X-band operation are shown in Table 1. The base frequency vis typically between 0 and 0.1. Typically, $v_1=v$ and $v_2=1-v$, although, as shown in Table 1, other combinations are possible. The optimum value of the ratio $q_{ex2}/q_{ex1}$ depends on the magnitude of a $q_{ex1}$ and $q_{ex2}$ and the value of the base frequency v, and is therefore not fixed.

TABLE 1

| | I | II | III | IV | V | VI |
|---|---|---|---|---|---|---|
| $v_1$ | v | v | 1 − v | 1 − v | 1 + v | 1 + v |
| $v_2$ | 1 − v | v + 1 | 2 − v | 2 + v | 2 − v | 2 + v |
| $q_{ex2}/q_{ex1}$ | ~2.9 | ~3.1 | ~7.1 | ~9.1 | ~6.9 | ~8.3 |

The optimum ratio of the amplitudes of the two additional excitation voltages, expressed as the ratio of the dimensional parameters $q_{ex1}$ and $q_{ex2}$ (in Table 1), is dependent on the excitation frequencies chosen. Increasing or decreasing the amplitude of excitation while maintaining the optimum amplitude ratio results in narrowing or widening of the stability band and hence increases or decreases the mass resolution of the quadrupole device.

Although operation of a quadrupole device 10 in the two excitation X-band mode is associated with various advantages (as described above), the inventors have found that the requirement for applying two auxiliary waveforms which are phase coherent (or phase locked) with one another can be arduous, for example in terms of the required electronics, etc. In particular, the precise electronic control that is required for two excitation X-band operation over a wide mass to charge ratio (m/z) range can add complexity and expense.

This is particularly the case where a digital drive system is employed. In a digitally driven quadrupole device 10 operating in a two auxiliary excitation X-band mode of operation (where two digitally generated phase locked auxiliary quadrupolar excitation waveforms are applied to the quadrupole 10), the cancellation of the y-axis instability bands near the tip of the stability diagram can be less effective than in the case where the quadrupole 10 is harmonically driven. This can lead to a reduction in the size of the stable X-band, particularly at high resolution.

These effects may be increased where phase and voltage amplitudes are imperfectly controlled, such as may typically be the case with less complex digital drive systems. Accordingly, satisfactory operation of a quadrupole device 10 in a two auxiliary excitation X-band mode of operation using a digital drive system may require a relatively complex and so expensive control system.

According to various embodiments, therefore, only a single auxiliary AC quadrupolar excitation waveform is applied to the quadrupole device 10 (in addition to the confining RF and resolving DC voltages) to alter the stability diagram to produce plural islands or regions of stability, including for example one or more "single excitation X-band" regions of stability, such as regions "C", "E" and further regions at lower a-values in the band "A"-"C"-"E", for example as in the example illustrated in FIG. 2.

It will be appreciated that FIG. 2 shows islands of stability being produced from the first (that is, lowest order, stability region), however in various other embodiments, islands of stability may be produced from other, higher order, stability regions.

Thus, according to various embodiments, the (single) auxiliary quadrupolar voltage may be selected to produce plural islands of stability within the first (or other (higher order)) stability region. The two or more stability regions may each comprise (be) one of the plural islands of stability within the first (or other (higher order)) stability region.

The a/q (DC/RF) ratio may then be selected such that, were (only) the confining quadrupolar RF voltage, resolving DC voltage, and single auxiliary AC quadrupolar excitation waveform to be applied to the quadrupole device 10, ions having mass to charge ratios (m/z) within more than one mass to charge ratio (m/z) range (each range corresponding to one of the plural islands or regions of stability) could be simultaneously transmitted by the quadrupole device 10. That is, according to various embodiments, the applied voltages are selected to corresponds to operation of the quadrupole device 10 (that is, to be suitable for causing the quadrupole device 10 to operate) in two or more stability regions simultaneously.

Moreover, according to various embodiments, the selection may be such that one of the mass to charge ratio (m/z) ranges corresponds to a "single excitation X-band" or "single excitation Y-band" stability region. For example, according to various embodiments, the applied voltages are selected to correspond to a scan line intersecting region "C", such as scan line 22 in FIG. 2.

As discussed above, operating the quadrupole device 10 with such a scan line can result, undesirably, in the simultaneous transmission of ions corresponding to other stability regions. For example, in the case of scan line 22, ions corresponding to region "D" may be simultaneously transmitted with ions corresponding to region "C". As can be seen from FIG. 2, other scan lines may result in the simultaneous transmission of ions corresponding to three or more regions or islands of stability.

According to various embodiments, therefore, ions having mass to charge ratio (m/z) values within mass to charge ratio (m/z) ranges corresponding to other, undesirable stability regions (such as ions corresponding to region "D") are then attenuated, prevented from exiting the quadrupole device 10, or prevented from being onwardly transmitted by the quadrupole device 10. According to various embodiments, this is done by the application of one or more (separate) AC (RF) dipolar excitation waveforms to the quadrupole device 10.

Thus in various embodiments, ions corresponding to at least one of the two or more stability regions are attenuated (prevented from being transmitted by the quadrupole device 10). In various embodiments, this is done by applying one or more AC (RF) dipolar voltage waveforms to the quadrupole device 10. The one or more AC (RF) dipolar excitation waveforms may be applied at one or more frequencies different to the frequency Ω of the main quadrupolar waveform and different to the frequency $\omega_{ex}$ of the single auxiliary AC (RF) quadrupolar excitation waveform.

According to various embodiments, the one or more AC (RF) dipolar excitation waveforms have the effect of increasing the radial amplitude of the unwanted ions (such as ions corresponding to region "D") as they traverse the quadrupole device 10, such that the unwanted ions are attenuated, for example, due to hitting the electrodes of the quadrupole device 10, or being ejected radially between or through the electrodes, or being perturbed sufficiently on exiting the quadrupole device 10 that they are unable to be transmitted to or detected by a downstream device.

Thus, in various embodiments, the one or more AC (RF) dipolar excitation waveforms are selected such that applying the AC (RF) dipolar voltage waveform(s) to the quadrupole device 10 causes ions corresponding to at least one stability region of the two or more stability regions to be attenuated as those ions pass through the quadrupole device 10. This may be done by selecting the number and/or frequency and/or amplitude and/or (x- or y-) direction of the one or more AC (RF) dipolar excitation waveforms, as appropriate.

Moreover, in various embodiments, the selection is such that ions corresponding to each of the two or more stability regions, except a single X-band, X-band-like, Y-band or Y-band-like stability region, are attenuated. An X-band-like (or Y-band-like) stability region may comprise a stability region for which instability (ejection) at the stability boundaries of the stability region may be in only the x- (or y-) direction.

Thus, according to various embodiments, the applied voltages are selected such that the quadrupole device 10 allows (substantially) only ions within a single (desired) mass to charge ratio (m/z) range to be transmitted. In particular embodiments, (substantially (only)) ions corresponding to (only) a single (single excitation) X-band, X-band-like, Y-band or Y-band-like stability region are transmitted by the quadrupole device 10.

Accordingly, various embodiments allow the quadrupole device 10 to operate in an X-band, X-band-like, Y-band or Y-band-like mode of operation while avoiding the simultaneous transmission of ions corresponding to other (less desirable) stability regions. For example, the quadrupole device 10 can operate in region "C", with ions corresponding to region "D" being attenuated.

Moreover, the AC (RF) dipolar waveform(s) can cause the attenuation of undesired ions as those ions pass through the quadrupole device 10, rather than for example, having to provide additional hardware for removing undesired ions before or after the ions pass through the quadrupole device 10. Thus additional hardware, for example in the form of an auxiliary mass filter 32 (for example, as described above), does not need to be provided, thereby reducing device complexity and cost.

Furthermore, undesired ion transmission can be avoided even with only a single auxiliary AC (RF) quadrupolar voltage waveform being applied to the quadrupole device 10. Accordingly, undesired ion transmission can be avoided without the need for multiple phase locked excitation waveforms, such as is required for a two excitation X-band mode of operation (for example, as described above). Thus, strict requirements on phase alignment and control of waveform amplitude ratios can be avoided. This means, for example, that the control system 14 can be simplified, thereby further reducing device complexity and cost. Moreover, and as discussed above, the various embodiments are accordingly particularly suitable for use in a digitally driven quadrupole device 10.

Accordingly, it will be appreciated that the various embodiments can allow a quadrupole device 10 to operate in a single stability region having improved performance characteristics, such as an X-band, X-band-like, Y-band or Y-band-like region of stability, without significantly increasing device complexity, and so without significantly increasing device cost.

Figure 5A:
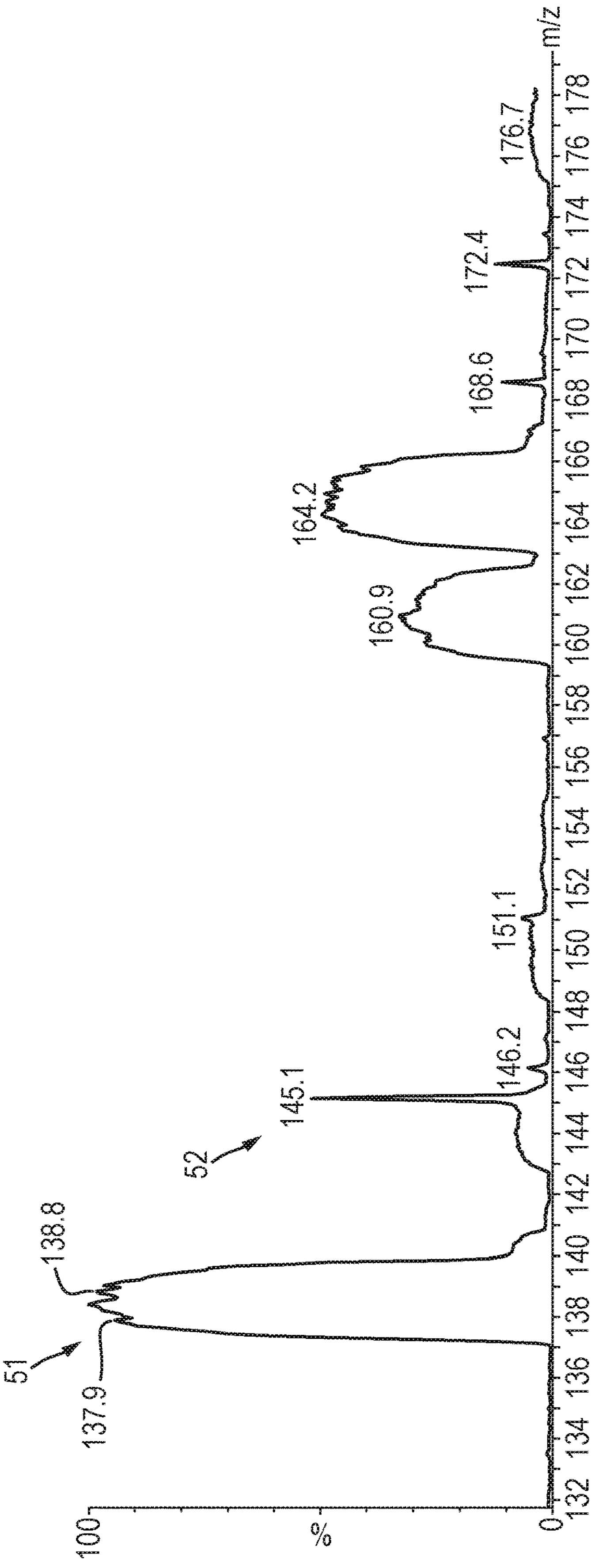
FIG. 5A shows a mass spectrum obtained using a quadrupole mass filter operated with a scan line intersecting two regions of stability simultaneously.

FIG. 5A shows a mass spectrum produced by operating the quadrupole device 10 with a single auxiliary quadrupolar excitation, and a scan line similar to scan line 22 in FIG. 2, with no attempt to remove unwanted ion signal (from region "D"), that is, without applying an auxiliary dipolar waveform to the quadrupole device 10.

In this example, the main RF frequency was Ω=1.185 MHz. The auxiliary quadrupolar waveform had a frequency of 0.9 of the frequency of the main RF drive, $\omega_{ex}=0.9\Omega$. The inscribed radius of the quadrupole was $r_0=5.33$ mm. The main RF amplitude $V_{RF}$ was scanned whilst maintaining a constant a/q (RF:DC amplitude) ratio.

As shown in FIG. 5A, in this example, each mass to charge ratio (m/z) species gives rise to two peaks in the mass spectrum. For example, FIG. 5A shows two peaks 51 and 52 arising from ions having the same mass to charge ratio (m/z) value which are stable in two regions of the stability diagram. In particular, peak 51 corresponds to a Y-band-like region such as region "D", and peak 52 corresponds to an X-band-like region such as region "C", as illustrated in FIG. 2. Peak 51 appears at a lower mass to charge ratio (m/z) value than peak 52, and has a lower resolution than peak 52.

Figure 5B:
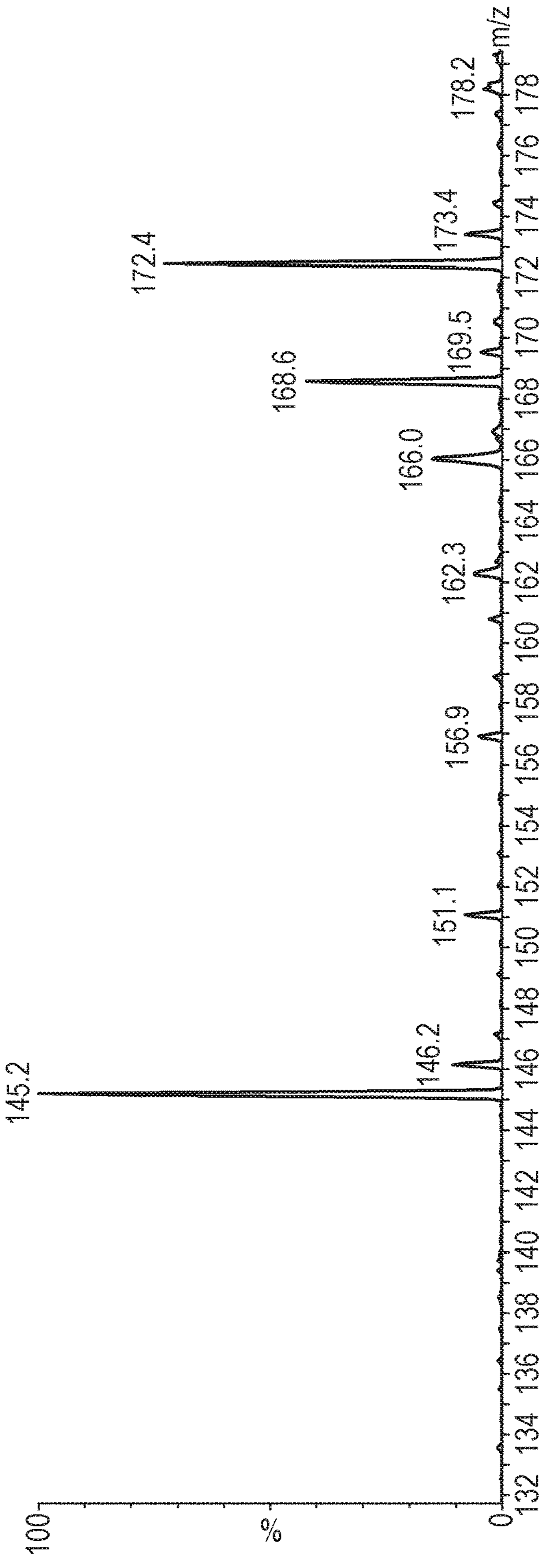
FIG. 5B illustrates a mass spectrum obtained using a quadrupole mass filter operated with a scan line intersecting two regions of stability simultaneously when an auxiliary dipolar excitation waveform was applied to the quadrupole mass filter in accordance with various embodiments.

FIG. 5B shows a mass spectrum produced by operating the quadrupole device 10 with the same conditions as described above for FIG. 5A, but with an additional auxiliary dipolar waveform being applied to the quadrupole device 10, according to various embodiments. The auxiliary dipolar excitation waveform had an amplitude of $V_d=5$V (zero to peak) and a frequency of $\omega_d=504$ KHz.

FIG. 5B shows that ions corresponding to stability region "D" are prevented from being transmitted (attenuated) due to the presence of the auxiliary dipolar excitation, resulting in a high quality mass spectrum.

Thus, in various embodiments, the quadrupole device 10 is operated so as to produce one or more mass spectra.

In various embodiments the main AC (RF) quadrupolar voltage waveform, the auxiliary AC (RF) quadrupolar voltage waveform and the one or more DC voltages are selected to correspond to operation of the quadrupole device in two or more stability regions simultaneously. In other words, the main quadrupolar voltage, the auxiliary quadrupolar voltage and the one or more DC voltages may be selected such that the scan line crosses two or more stability regions. However, it will be appreciated that in various embodiments the quadrupole device 10 will not actually operate in the two or more stability regions simultaneously since the AC (RF) dipolar voltage waveform will cause ions corresponding to at least one of the two or more stability regions to become unstable in the quadrupole device 10.

Accordingly, it will be appreciated that the main AC (RF) quadrupolar voltage waveform, the auxiliary AC (RF) quadrupolar voltage waveform and the one or more DC voltages may be suitable for causing the quadrupole device 10 to operate in two or more stability regions simultaneously. That is, the applied voltages may be selected such that were (only) the main AC (RF) quadrupolar voltage waveform, the auxiliary AC (RF) quadrupolar voltage waveform and the one or more DC voltages to be applied (simultaneously) to the quadrupole device (and not the dipolar voltage waveform), ions having mass to charge ratios within at least two different mass to charge ratios ranges (each range corresponding to a respective one of the two or more stability regions) could assume stable trajectories in the quadrupole device 10 simultaneously (and so be transmitted by the quadrupole device (simultaneously)).

Although the above embodiments have been described with particular reference to the applied voltages being selected such that the quadrupole device 10 (only) transmits ions corresponding to a single excitation X-band region of stability (and the auxiliary AC (RF) dipolar waveform(s) causes ions corresponding to one or more other stability regions to be attenuated), it will be appreciated that the voltages may be selected such that the quadrupole device 10 (only) transmits ions corresponding to any desired region of stability (and ions corresponding to any other region of stability are attenuated).

For example, the applied voltages may be selected such that the quadrupole device 10 (only) transmits ions corresponding to the two excitation X-band, or Y-band stability region, an X-band-like stability region or a Y-band-like stability region, and ions corresponding to other bands of stability are attenuated.

Accordingly, it will also be appreciated that although the above embodiments have been described with particular reference to only a single auxiliary quadrupolar waveform being applied to the quadrupole device 10, in other embodiments plural (for example, 2, 3 or more) auxiliary quadrupolar waveforms may be applied to the quadrupole device 10.

It will also be appreciated that in various embodiments, the quadrupole device 10 operates as a quadrupole mass filter in a scanning mode of operation. In these embodiments, the amplitude and/or frequency of the main and/or auxiliary quadrupolar waveform and/or the amplitude of the DC voltage may (each) be varied adjusted or scanned with mass to charge ratio, for example so as to maintain a constant peak width or constant resolution over the scanned range of mass to charge ratio values.

Similarly, the number and/or amplitude and/or frequency of the AC (RF) dipolar waveform(s) may also be varied, adjusted or scanned, for example in dependence on mass to charge ratio and/or mass resolution, for example so as to ensure efficient removal (attenuation) of unwanted ions.

It will also be appreciated that one or more AC (RF) dipolar excitation waveforms may be applied to one or both of the pairs of opposing electrodes of the quadrupole device 10. Accordingly, undesired ions may be ejected or perturbed in any radial direction.

The quadrupole device 10 (for example, quadrupole mass filter) may be operated using one or more sinusoidal, for example, analogue, RF or AC signals. However, it is also possible to operate the quadrupole device 10 using one or more digital signals, for example for one or more or all of the applied voltages. A digital signal may have any suitable waveform, such as a square or rectangular waveform, a pulsed EC waveform, a three phase rectangular waveform, a triangular waveform, a sawtooth waveform, a trapezoidal waveform, etc.

As described above, in various embodiments, plural different voltages are (simultaneously) applied to the electrodes of the quadrupole device 10, for example by the one or more voltage sources 12, comprising a main quadrupolar (RF or AC) voltage waveform, an auxiliary quadrupolar (RF or AC) voltage waveform, a dipolar (RF or AC) voltage waveform, and one or more DC voltages. The plural different voltages may be applied to some or all (four) of the quadrupole electrodes.

The main quadrupolar voltage waveform may have any suitable amplitude $V_{RF}$. The main quadrupolar voltage waveform may have any suitable frequency Ω, such as for example (i)<0.5 MHz; (ii) 0.5-1 MHz; (iii) 1-2 MHz; (iv) 2-5 MHz; or (v)>5 MHz. The main quadrupolar voltage waveform may comprise an RF or AC voltage, and for example may take the form $V_{RF}\cos(\Omega t)$.

Equally, each of the one or more DC voltages may have any suitable amplitude U.

The auxiliary quadrupolar voltage waveform may comprise an RF or AC voltage, and for example may take the form $V_{ex}\cos(\omega_{ex}t+\alpha_{ex})$, where $V_{ex}$ is the amplitude of the auxiliary quadrupolar voltage waveform, $\omega_{ex}$ is the frequency of the auxiliary quadrupolar voltage waveform, and $\alpha_{ex}$ is an initial phase of the auxiliary quadrupolar voltage waveform with respect to the phase of the main quadrupolar voltage waveform.

The auxiliary quadrupolar voltage waveform may have any suitable amplitude $V_{ex}$, and any suitable frequency $\omega_{ex}$.

Equally, the (or each) dipolar voltage waveform may have any suitable amplitude $V_d$, and any suitable frequency $\omega_d$.

One or plural dipolar voltages may be applied to the quadrupole device. Where plural dipolar voltages are applied to the quadrupole device, each dipolar voltage may have a different frequency and/or amplitude to each other dipolar voltage.

The amplitude of the main quadrupolar voltage waveform may be greater than the amplitude of the auxiliary quadrupolar voltage waveform, $V_{RF}>V_{ex}$. The amplitude of the main quadrupolar voltage waveform may be greater than the amplitude of the (or each) dipolar voltage waveform(s), $V_{RF}>V_d$.

The amplitude of the (or each) dipolar voltage waveform may be different to or (approximately) equal to the amplitude of the auxiliary quadrupolar voltage waveform, $V_d=V_{ex}$. The amplitude of each dipolar voltage waveform may be different to or (approximately) equal to the amplitude of each other dipolar voltage waveform.

The frequency of the main quadrupolar voltage waveform may be unequal to the frequency of the auxiliary quadrupolar voltage waveform, $\Omega \neq \omega_{ex}$. The frequency of the main quadrupolar voltage waveform may be greater than the frequency of the auxiliary quadrupolar voltage waveform, $\Omega > \omega_{ex}$. The frequency of the auxiliary quadrupolar voltage waveform may be equal to a fraction v of the frequency of the main quadrupolar voltage waveform, $\omega_{ex} = v\Omega$. The fraction v may be selected from the group consisting of: (i)<0.5; (ii) 0.5-0.75; (iii) 0.75-0.85; (iv) 0.85-0.9; (v) 0.9-0.95; and (vi)>0.95.

The frequency of the (or each) dipolar voltage waveform may be unequal to the frequency of the main and/or auxiliary quadrupolar voltage waveform, $\omega_d \neq \Omega$; $\omega_d \neq \omega_{ex}$. The frequency of the (or each) dipolar voltage waveform may be less than the frequency of the main and/or auxiliary quadrupolar voltage waveform, $\omega_d < \Omega$; $\omega_d < \omega_{ex}$. The frequency of the (or each) dipolar voltage waveform may be equal to a fraction $v_d$ of the frequency of the main quadrupolar voltage waveform, $\omega_d = v_d \Omega$. The fraction $v_d$ may be selected from the group consisting of: (i)<0.1; (ii) 0.1-0.4; (iii) 0.4-0.4.5; (iv) 0.45-0.5; (v) 0.5-0.8; and (vi)>0.8. The frequency of each dipolar voltage waveform may be different to or equal to the frequency of each other dipolar voltage waveform.

The amplitude of the dipolar voltage may be selected to be sufficient to drive all ions with undesired mass to charge ratios (m/z) to instability. This will depend, in particular, on the mass to charge ratio(s) (m/z), and transit time(s) of the undesired ions through the quadrupole device 10 (more so than on the main and auxiliary quadrupolar voltage amplitudes and frequencies for example).

Suitable dipolar voltage amplitudes may be up to around 10 V (or less). In various embodiments, the dipolar voltage amplitude may be determined empirically, for example during an instrument setup/calibration process. If too large a dipolar excitation is applied to the quadrupole device 10, the (X-band peak) ions that it is desired to transmit may be attenuated.

For a “normal” mode of operation without the auxiliary quadrupolar excitation voltage, the secular frequency of a stable ion is directly related to its β value in the x/y axes (where $\omega = \Omega * \beta/2$). So, for any point in the stability diagram the secular frequency can be calculated. Applying a dipolar excitation at the secular frequency leads to attenuation of ions at the corresponding mass to charge ratio (m/z) value.

When the auxiliary quadrupolar excitation is applied (as described above), bands of instability are opened up which leads to the stability diagram breaking up into islands, for example as shown in FIG. 2. The bands of instability are located at β values corresponding to the denominator of the auxiliary frequency. For example, for a $1/20$ or $19/20$ excitation, bands are opened at β values of 0.95, 0.9, 0.85, and so on.

Considering the example shown in FIG. 2, the β values for the regions that a scan line crosses can thus be approximated. So, for example, region “C” spans from $\beta_x = 0.95$ to 1, while region “D” spans from $\beta_x = 0.85$ to 0.9. The same can be done for the $\beta_y$ values.

If the β values are approximated to lie in the centre of these ranges, a secular frequency value for these regions of the stability diagram can be arrived at, namely $\Omega * 0.4375$ for region “D”, and $\Omega * 0.4875$ for region “C”. Therefore, for $\Omega = 1$ MHz, a dipolar excitation may be applied at 437.5 kHz to attenuate region “D”, or at 487.5 kHz to attenuate region “C”. Similar values can be arrived at for the other regions of stability, such as for example region “B”.

It should be noted that the above values are only approximate, in particular since the application of the auxiliary quadrupolar waveform can distort the secular motion of the ion(s). However, ion motion for a given location in the stability diagram can be simulated, and for example, a Fast Fourier Transform (FFT) can be applied to the trace of the ion motion, to directly calculate the frequency components of the ion motion. When this is done for the regions in FIG. 2, the largest frequency components are found to be at 436.1 kHz for region “D” and 485.3 kHz for region “C”, in reasonably good agreement with the theoretical estimates above.

Although the method outlined above can give a good estimate for the appropriate dipolar voltage frequency(ies), the exact best value may be determined experimentally. Thus, in various embodiments, the frequency(ies) of the dipolar voltage(s) may be determined empirically, for example in an instrument setup/calibration process (along with the amplitude(s)).

As described above, a single or multiple dipolar voltages may be applied to the quadrupole device. Depending on the width of the region that it is desired to attenuate it may be preferential to apply multiple dipolar voltages, for example each with a relatively small amplitude, instead of a single dipolar voltage with a relatively large amplitude. This may be selected in order to maximise or increase the efficiency of attenuation of the undesired region, while minimising or reducing any attenuation or other impact on the desired region.

As described above, the or each of the dipolar voltage(s) may be applied in any (x- or y-) direction. For example, where multiple dipolar voltages are applied to the quadrupole device 10, multiple dipolar voltages may be applied in one (x- or y-) direction and/or in both (x- and y-) directions. That is, each of the dipolar voltages may be applied across either of the x-rod-pair and the y-rod-pair, and multiple dipolar voltages may be applied across one of the x-rod-pair and the y-rod-pair and/or across both of the x-rod-pair and the y-rod-pair. The frequency of the or each dipolar voltage may depend on which (x- or y-) direction the dipolar voltage is applied.

Although various embodiments above have been described in terms of the use of an X-band or X-band-like stability condition, it would also be possible to use a Y-band or Y-band-like stability condition, e.g. in a corresponding manner, mutatis mutandi. A Y-band or Y-band-like stability condition may be produced and used for mass to charge ratio (m/z) filtering (rather than an X-band) by application of suitable excitation frequencies.

The quadrupole device 10 may be operated in various modes of operation including a mass spectrometry (“MS”) mode of operation; a tandem mass spectrometry (“MS/MS”) mode of operation; a mode of operation in which parent or precursor ions are alternatively fragmented or reacted so as to produce fragment or product ions, and not fragmented or reacted or fragmented or reacted to a lesser degree; a Multiple Reaction Monitoring (“MRM”) mode of operation; a Data Dependent Analysis (“DDA”) mode of operation; a Data Independent Analysis (“DIA”) mode of operation; a Quantification mode of operation; and/or an Ion Mobility Spectrometry (“IMS”) mode of operation.

In various embodiments, the quadrupole device 10 may be operated in a constant mass resolving mode of operation, that is ions having a single mass to charge ratio or single mass to charge ratio range may be selected and onwardly transmitted by the quadrupole mass filter. In this case, the various parameters of the plural voltages that are applied to the quadrupole device 10 (as described above) may be (selected and) maintained and/or fixed, as appropriate.

Alternatively, the quadrupole device 10 may be operated in a varying mass resolving mode of operation, that is ions having more than one particular mass to charge ratio or more than one mass to charge ratio range may be selected and onwardly transmitted by the mass filter.

For example, according to various embodiments, the set mass of the quadrupole device 10 may scanned, for example, substantially continuously, for example, so as to sequentially select and transmit ions having different mass to charge ratios or mass to charge ratio ranges. Additionally or alternatively, the set mass of the quadrupole device may altered discontinuously and/or discretely, for example between plural different values of mass to charge ratio (m/z).

(As used herein, the set mass of the quadrupole device is the mass to charge ratio or the centre of the mass to charge ratio range at which ions are selected and/or transmitted by the quadrupole device.)

In these embodiments, one or more or each of the various parameters of the plural voltages that are applied to the quadrupole device 10 (as described above) may be scanned, altered and/or varied, as appropriate.

In particular, in order to scan, alter and/or vary the set mass of the quadrupole device, the amplitude of the main drive voltage $V_{RF}$ and the amplitude of the DC voltage U may be scanned, altered and/or varied. The amplitude of the main drive voltage $V_{RF}$ and the amplitude of the DC voltage U may be increased or decreased in a continuous, discontinuous, discrete, linear, and/or non-linear manner, as appropriate. This may be done while maintaining the ratio of the main resolving DC voltage amplitude to the main RF voltage amplitude $\lambda=2\ U/V_{RF}$ constant or otherwise.

As transmission through the quadrupole device 10 is related to its resolution, it is often desirable to maintain a lower resolution at low mass to charge ratio (m/z) and higher resolution at higher mass to charge ratio (m/z). For example, it is common to operate a quadrupole mass filter with a fixed peak width (in Da) at each of the desired mass to charge ratio (m/z) values or over the desired mass to charge ratio (m/z) range.

Thus, according to various embodiments, the resolution of the quadrupole device 10 is scanned, altered and/or varied, for example, over time. The resolution of the quadrupole device 10 may be varied in dependence on (i) mass to charge ratio (m/z) (for example, the set mass of the quadrupole device); (ii) chromatographic retention time (RT) (for example, of an eluent from which the ions are derived eluting from a chromatography device upstream of the quadrupole device); and/or (iii) ion mobility (IMS) drift time (for example, of the ions as they pass through an ion mobility separator upstream or downstream of the quadrupole device 10).

The resolution of the quadrupole device 10 may be varied in any suitable manner. For example, one or more or each of the various parameters of the plural voltages that are applied to the quadrupole device 10 (as described above) may be scanned, altered and/or varied such that the resolution of the quadrupole device 10 is scanned, altered and/or varied.

According to various embodiments, the quadrupole device 10 may be part of an analytical instrument such as a mass and/or ion mobility spectrometer. The analytical instrument may be configured in any suitable manner.

Figure 6:
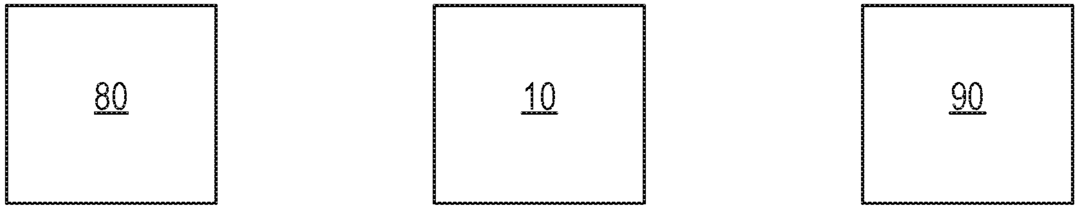
FIGS. 6 and 7 show schematically various analytical instruments comprising a quadrupole device in accordance with various embodiments.

FIG. 6 shows an embodiment comprising an ion source 80, the quadrupole device 10 downstream of the ion source 80, and a detector 90 downstream of the quadrupole device 10.

Ions generated by the ion source 80 may be injected into the quadrupole device 10. The plural voltages applied to the quadrupole device 10 may cause the ions to be radially confined within the quadrupole device 10 and/or to be selected or filtered according to their mass to charge ratio, for example, as they pass through the quadrupole device 10.

Ions that emerge from the quadrupole device 10 may be detected by the detector 90. An orthogonal acceleration time of flight mass analyser may optionally be provided, for example, adjacent the detector 90

Figure 7:
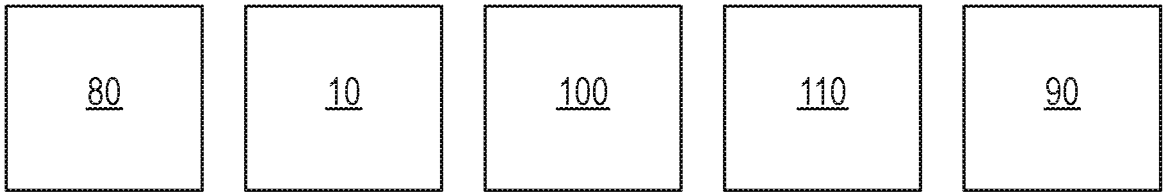

FIG. 7 shows a tandem quadrupole arrangement comprising a collision, fragmentation or reaction device 100 downstream of the quadrupole device 10, and a second quadrupole device 110 downstream of the collision, fragmentation or reaction device 100. In various embodiments, one or both quadrupoles may be operated in the manner described above.

In these embodiments, the ion source 80 may comprise any suitable ion source. For example, the ion source 80 may be selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; and (xxx) a Low Temperature Plasma ("LTP") ion source.

The collision, fragmentation or reaction device 100 may comprise any suitable collision, fragmentation or reaction device. For example, the collision, fragmentation or reaction device 100 may be selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

Various other embodiments are possible. For example, one or more other devices or stages may be provided upstream, downstream and/or between any of the ion source 80, the quadrupole device 10, the fragmentation, collision or reaction device 100, the second quadrupole device 110, and the detector 90.

For example, the analytical instrument may comprise a chromatography or other separation device upstream of the ion source 80. The chromatography or other separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The analytical instrument may further comprise: (i) one or more ion guides; (ii) one or more ion mobility separation devices and/or one or more Field Asymmetric Ion Mobility Spectrometer devices; and/or (iii) one or more ion traps or one or more ion trapping regions.

Although the present invention has been described with reference to preferred embodiments, it will be understood by those skilled in the art that various changes in form and detail may be made without departing from the scope of the invention as set forth in the accompanying claims.

The invention claimed is:

1. A method of operating a quadrupole device, the method comprising:

applying a main AC quadrupolar voltage to the quadrupole device;

applying an auxiliary AC quadrupolar voltage to the quadrupole device;

applying an AC dipolar voltage to the quadrupole device;

applying one or more DC voltages to the quadrupole device;

wherein the main quadrupolar voltage, the auxiliary quadrupolar voltage, and the one or more DC voltages are selected to correspond to operation of the quadrupole device in two or more stability regions simultaneously; and wherein the dipolar voltage is configured to cause ions corresponding to at least one of the two or more stability regions to be attenuated.

2. The method of claim 1, wherein the dipolar voltage is configured to attenuate ions corresponding to a stability region or stability regions of the two or more stability regions other than a single selected stability region.

3. The method of claim 2, wherein the single selected stability regions is an X-band, X-band-like, Y-band or Y-band-like stability region.

4. The method of claim 1, wherein the dipolar voltage is configured to cause ions to be attenuated by causing the radial amplitudes of at least some of the ions to increase as the ions pass through the quadrupole device.

5. The method of claim 1, wherein one or more of the main quadrupolar voltage, the auxiliary quadrupolar voltage and the dipolar voltage comprises a digital voltage.

6. The method of claim 1, wherein the quadrupole device comprises four electrodes, and each voltage is applied to at least one of the four electrodes.

7. Apparatus comprising:

a quadrupole device; and one or more voltage sources configured to:

apply a main AC quadrupolar voltage to the quadrupole device;

apply an auxiliary AC quadrupolar voltage to the quadrupole device;

apply an AC dipolar voltage to the quadrupole device;

apply one or more DC voltages to the quadrupole device;

wherein the main quadrupolar voltage, the auxiliary quadrupolar voltage, and the one or more DC voltages are selected to correspond to operation of the quadrupole device in two or more stability regions simultaneously; and wherein the dipolar voltage is configured to cause ions corresponding to at least one of the two or more stability regions to be attenuated.

8. The apparatus of claim 7, wherein the dipolar voltage is configured to attenuate ions corresponding to a stability region or stability regions of the two or more stability regions other than a single selected stability region.

9. The apparatus of claim 8, wherein the single selected stability regions is an X-band, X-band-like, Y-band or Y-band-like stability region.

10. The apparatus of claim 7, wherein the dipolar voltage is configured to cause ions to be attenuated by causing the radial amplitudes of at least some of the ions to increase as the ions pass through the quadrupole device.

11. The apparatus of claim 7, wherein at least one of the one or more voltages sources comprises a digital voltage source.

12. The apparatus of claim 7, wherein the quadrupole device comprises four electrodes, and the one or more voltages sources are configured to apply each voltage to at least one of the four electrodes.

13. Apparatus comprising:

a quadrupole device; and one or more voltage sources configured to:

apply a main quadrupolar voltage to the quadrupole device;

apply an auxiliary quadrupolar voltage to the quadrupole device; and apply one or more DC voltages to the quadrupole device;

wherein the main quadrupolar voltage, the auxiliary quadrupolar voltage and the one or more DC voltages are selected to correspond to operation of the quadrupole device in two or more stability regions simultaneously; and wherein the apparatus is configured to attenuate ions corresponding to at least one of the two or more stability regions as those ions pass through the quadrupole device.

14. A mass and/or ion mobility spectrometer, comprising the apparatus of claim 7.

* * * * *